(12) United States Patent
Lee (10) Patent No.: US 6,561,349 B2
(45) Date of Patent: May 13, 2003

(54) STORAGE BOX FOR PORTABLE ELECTRONIC APPARATUS

(75) Inventor: Jane Lee, Taipei Hsien (TW)

(73) Assignee: Silitek Corporation, Taipei (TW)

( * ) Notice: Subject to any disclaimer, the term of this patent is extended or adjusted under 35 U.S.C. 154(b) by 9 days.

(21) Appl. No.: 09/873,177

(22) Filed: Jun. 5, 2001

(65) Prior Publication Data

US 2002/0179470 A1 Dec. 5, 2002

(51) Int. Cl.[7] .............................................. B65D 85/00
(52) U.S. Cl. ...................... 206/320; 206/45.2; 361/683; 174/59
(58) Field of Search ................................ 206/320, 305, 206/576, 314, 45.2, 14, 750; 190/100, 102, 109, 900, 119; 361/679, 683, 724, 728, 748; 174/50, 53, 54, 59, 65 R; 220/831, 832, 522, 326; 312/223.2

(56) References Cited

U.S. PATENT DOCUMENTS

| | | | | |
|---|---|---|---|---|
| 2,310,641 A | * | 2/1943 | Lux ........................... | 206/45.2 |
| 2,735,542 A | * | 2/1956 | Shnitzler ..................... | 206/228 |
| 4,658,956 A | * | 4/1987 | Takeda et al. ............... | 206/305 |
| 5,177,665 A | * | 1/1993 | Frank et al. .................. | 108/44 |
| 5,212,628 A | * | 5/1993 | Bradbury ..................... | 361/683 |
| 5,227,953 A | * | 7/1993 | Lindberg et al. ............ | 361/686 |
| 5,552,957 A | * | 9/1996 | Brown et al. ............... | 346/145 |
| 5,871,094 A | * | 2/1999 | Leibowitz .................... | 108/43 |
| 6,362,954 B1 | * | 3/2002 | LeVander ................... | 190/100 |

* cited by examiner

Primary Examiner—M. D. Patterson
Assistant Examiner—Jila M. Mohandesi
(74) Attorney, Agent, or Firm—Rosenberg, Klein & Lee (57) ABSTRACT

A storage box for a portable electronic apparatus includes a box body and a cover. The box body has a first accommodation space and a second accommodation space therein. The first accommodation space has a first connector therein. The cover has a second connector therein that is connected to the first connector. The two accommodation spaces provide for receipt of a portable electronic apparatus and a foldable keyboard.

1 Claim, 8 Drawing Sheets

STORAGE BOX FOR PORTABLE ELECTRONIC APPARATUS

FIELD OF THE INVENTION

The present invention relates to a storage box for portable electronic apparatus, especially to a storage box for storing simultaneously a PDA (personal digital assistant) and a keyboard with enhanced safety and convenience.

BACKGROUND OF THE INVENTION

The PDA (personal digital assistant) is a portable electronic apparatus with growing attraction and provides more portability over notebook computers.

The present PDA has diverse functions for mobile workers such as address book, schedule, agendum and memo. For example, user can easily find a telephone entry with a stylus instead of thumbing a physical address book.

Beside above-mentioned functions, the present PDA can also access e-mail and execute various application programs such as spread sheet, e-map, word processor, e-book or game.

Figure 1:
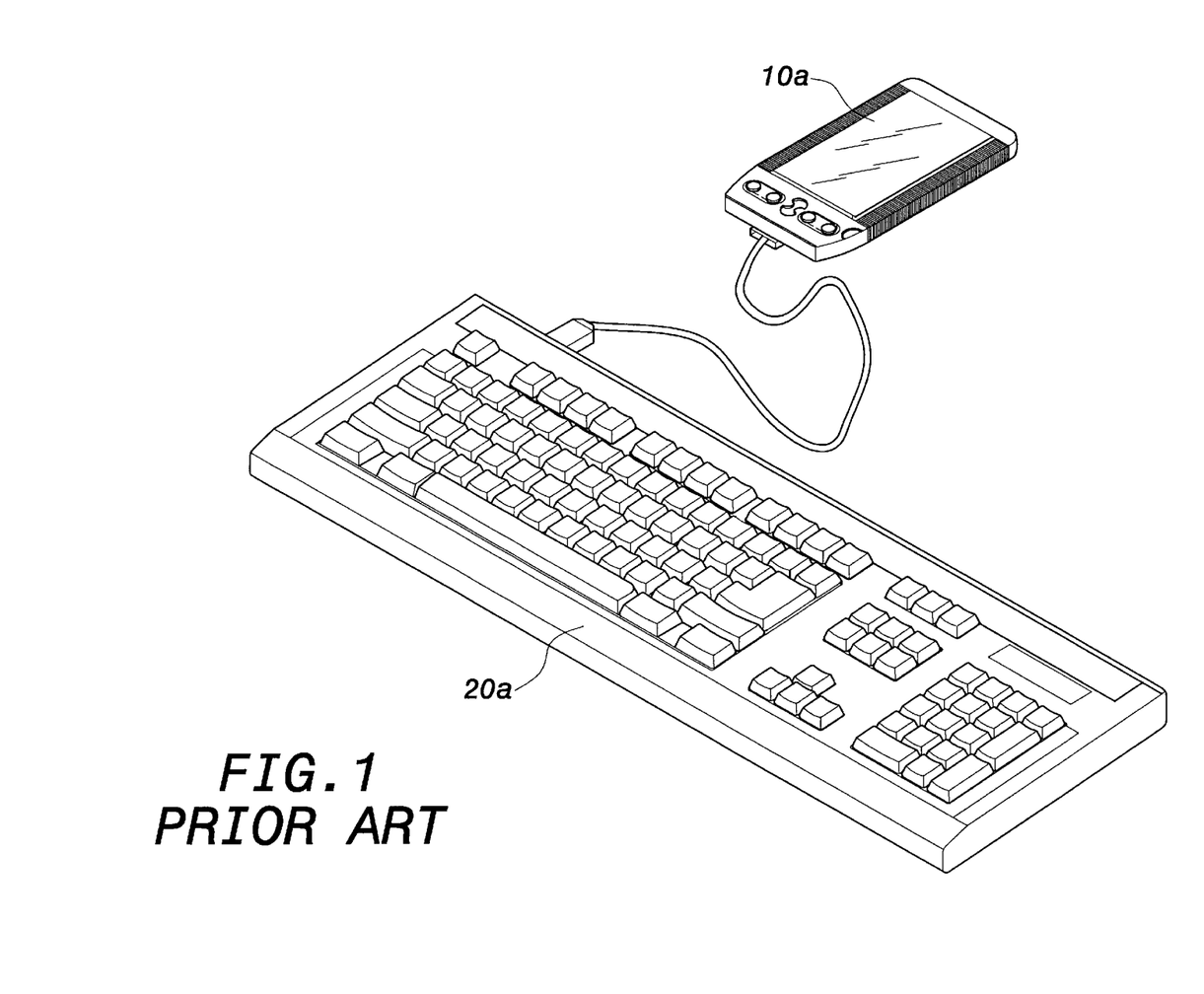
FIG. 1 shows the perspective view of prior art PDA connected with a keyboard.

Moreover, most PDA has built-in wireless communication module to receive real-time information such as stock news, traffic condition, and weather forecast and instant news. FIG. 1 shows a schematic view of a prior art PDA 10a. For inputting interactive data, the PDA 10a is connected to a keyboard 20, which is more miscellaneous than a stylus pen. However, in prior art PDA, the LCD panel thereof is a fragile component and a protective cover or sheath is required to protect the PDA and the LCD panel. The protective cover or sheath provides unsatisfactory protection for the PDA and the LCD panel; and cannot protect the PDA and the keyboard simultaneously.

SUMMARY OF THE INVENTION

It is an object of the present invention to provide a storage box for portable electronic apparatus, which has a first accommodation space and a second accommodation space to store the portable electronic apparatus such as PDA and foldable keyboard.

It is another object of the present invention to provide a storage box for portable electronic apparatus, which has a first accommodation space and a second accommodation space; and a foldable keyboard can be unfolded to placed in the two spaces and a PDA is lay on a supine cover of the box.

To achieve above object, the present invention provides a storage box for portable electronic apparatus comprising a box body and a cover. The box body has a first accommodation space and a second accommodation space therein. The first accommodation space has a first connector therein. The cover has a second connector therein and connected to the first connector. The two accommodation spaces can be used to receive a portable electronic apparatus and a foldable keyboard such that the protective function and portability are enhanced.

The various objects and advantages of the present invention will be more readily understood from the following detailed description when read in conjunction with the appended drawing, in which:

DETAILED DESCRIPTION OF THE INVENTION

Figure 2:
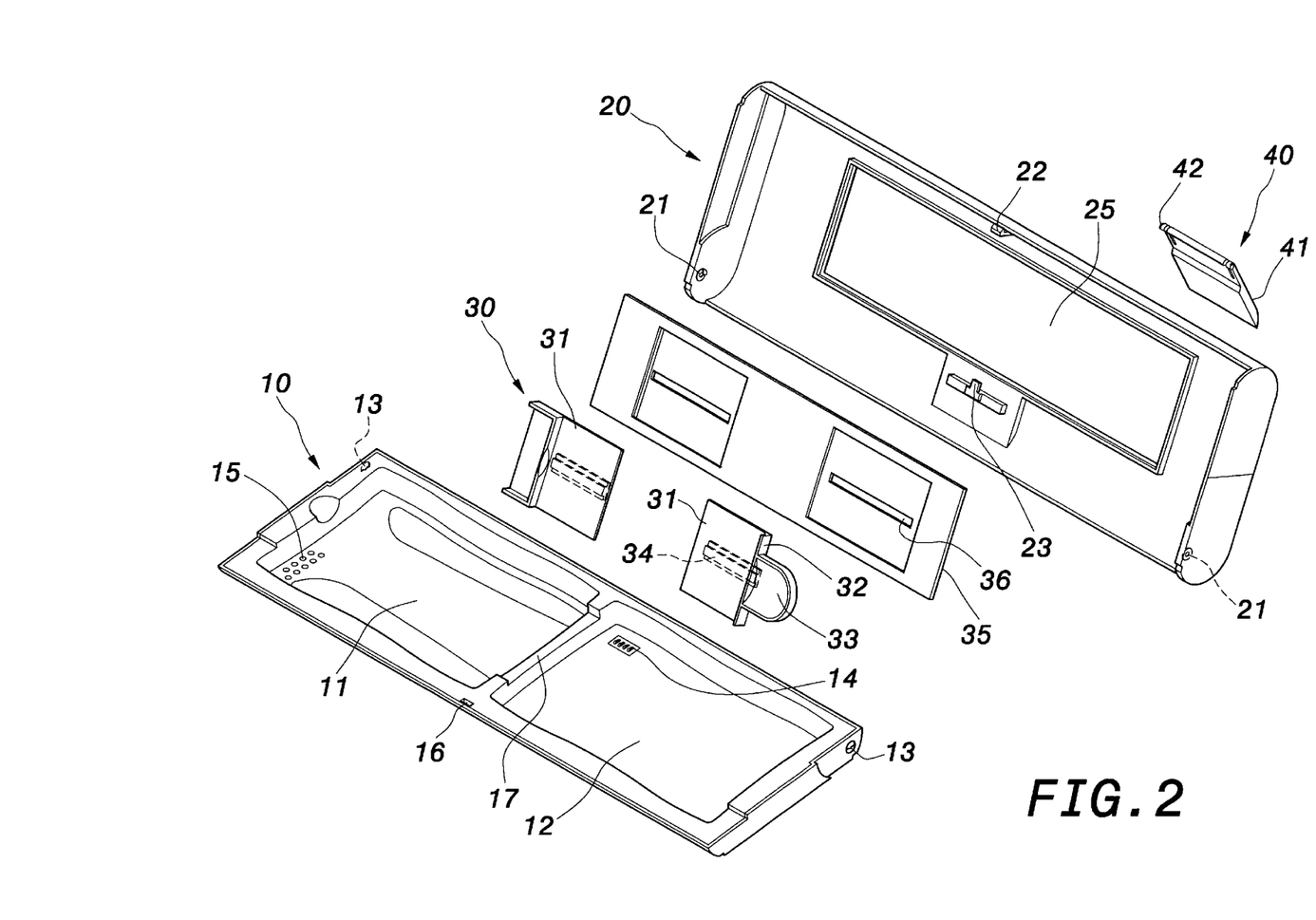
FIG. 2 shows the exploded view of the first preferred embodiment of the present invention.
Figure 3:
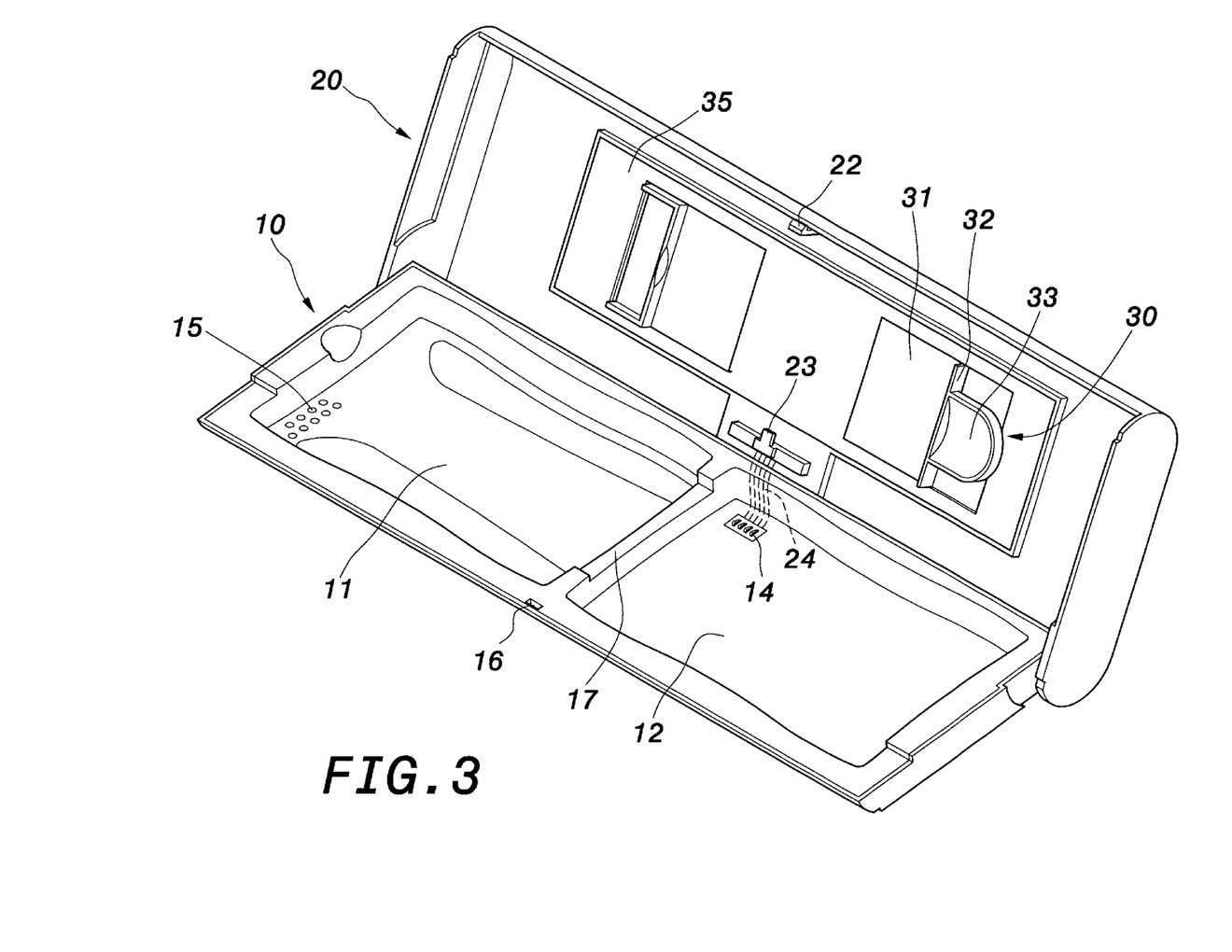
FIG. 3 shows the perspective view of the first preferred embodiment of the present invention with opened cover.
Figure 4:
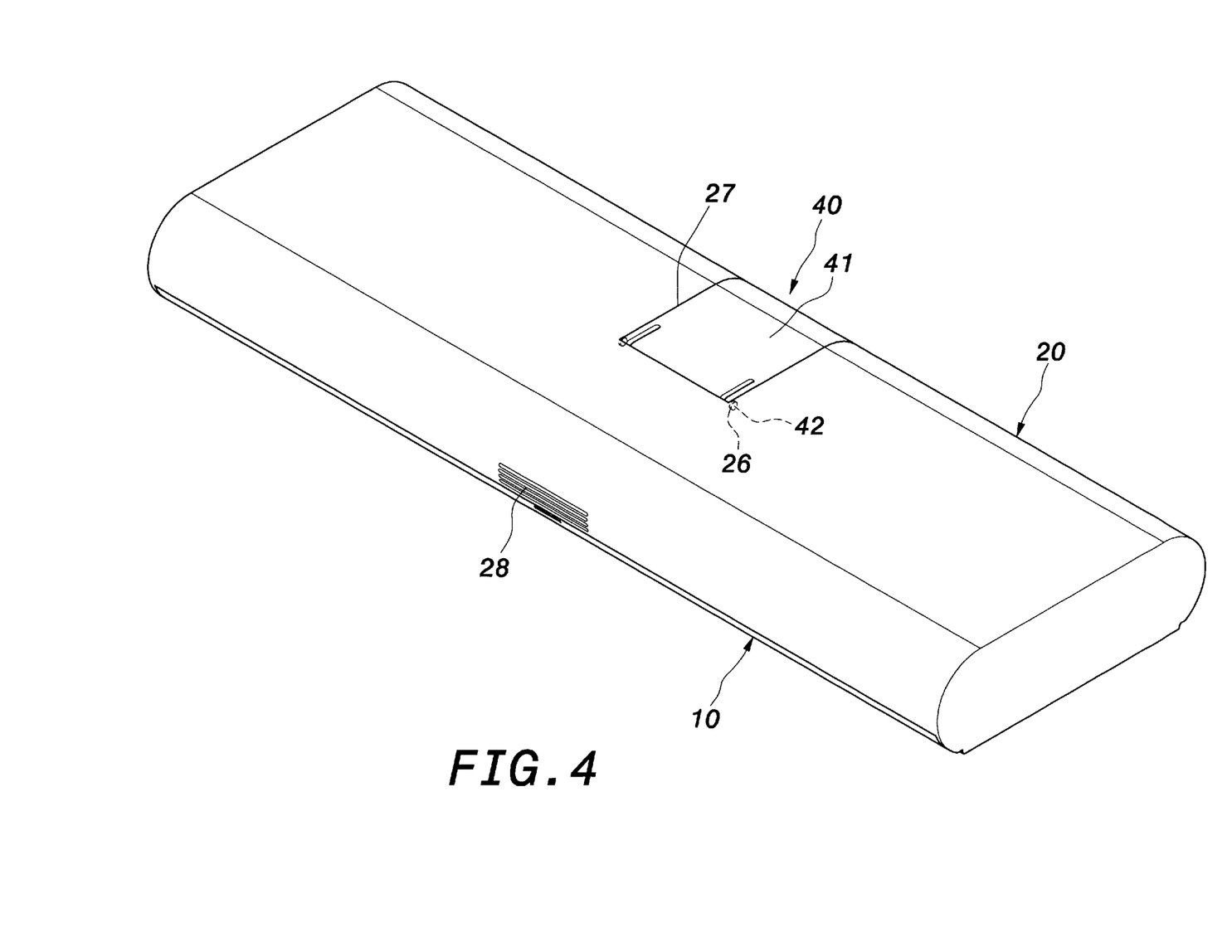
FIG. 4 shows the perspective view of the first preferred embodiment of the present invention with closed cover.

With reference now to FIGS. 2, 3 and 4, the present invention provides a storage box for portable electronic apparatus. The storage box comprises a box body 10, a cover 20 and a clamping means 30. The box body 10 is of rectangular shape or other shape, and has a concave first accommodation space 11 and a concave second accommodation space 12. The shapes of the two accommodation spaces are not limited as long as a PDA and a keyboard can be housed therein, respectively. The numbers of the accommodation spaces is also not limited. In this preferred embodiment, the two accommodation spaces 11 and 12 are separated by a spacer 17 with collapsible property. The spacer 17 can be collapsed when the compartment function is not required.

The box body 10 has two pivotal holes 13 on two rear lateral sides thereof and a locking hole 16 on front side thereof. The box body 10 has a first connector 14 in the second accommodation space 12 thereof, which is electrically connected to a keyboard or a PDA in the second accommodation space 12.

The box body 10 is entirely or partially transparent to manifest the information on the display panel of the PDA. The box body 10 or the cover 20 is equipped with sound apertures 15 through which sound wave is passed.

The cover 20 has shape similar to that of the box body 10 and has two pivotal posts 21 on two rear lateral sides thereof and corresponding to two pivotal holes 13 of the box body 10. The cover 20 is pivotally connected to the box body 10 through the two pivotal posts 21 and the two pivotal holes 13 such that the cover 20 can cover the box body 10 and be pulled to open.

The cover 20 further has a locking bump 22 on front side thereof and corresponding to the locking hole 16 of the box body 10. When the cover 20 covers the box body 10, as shown in FIG. 4, the locking bump 22 is locked into the locking hole 16 to enhance seal of the box. The cover 20 has corrugation 28 on front side thereof to facilitate handling.

The cover 20 has a second connector 23 therein and projecting from inner wall of the cover 20. The second connector 23 is electrically connected to PDA on the cover 20. The second connector 23 is electrically connected to the first connector 14 through a connection cable 24 through which PDA is electrically connected to a foldable keyboard. The cover 20 further has a fixing part 25 on inner side thereof and a supporting means 40 on outer side thereof. The supporting means 40 has such structure to support the opened cover 20 to supine state. In this preferred embodiment, the supporting means 40 is a panel-shape rack 41 and has two pivotal shafts 42 on both sides thereof. The cover 20 has two pivotal holes 26 corresponding to the two pivotal shafts 42.

The panel-shape rack 41 is pivotally connected to the cover 20 through the two pivotal shafts 42 and the two pivotal holes 26. The panel-shape rack 41 can be received in a groove 27 on outer side of the cover 20 and can be pulled to certain inclined angle to support the cover 20 in supine stage as shown in FIG. 4.

The clamping means 30 is provided on inner side of the cover 20 and has such structure to clamp the PDA placed on the cover 20. In this preferred embodiment, the clamping means 30 is composed of two clamping members 31 of L shape and having a clamping part 32 and a holding part 33. The clamping member 31 has a T-shaped sliding block 34 on rear side thereof.

The fixing part 25 has a fixing plate 35 fixed to the fixing part 25 by glue or embedding. The fixing plate 35 has two sliding grooves 36 along lateral direction. The sliding block 34 is slidably fit in the sliding groove 36 such that the clamping member 31 can be slid in lateral direction.

Figure 5:
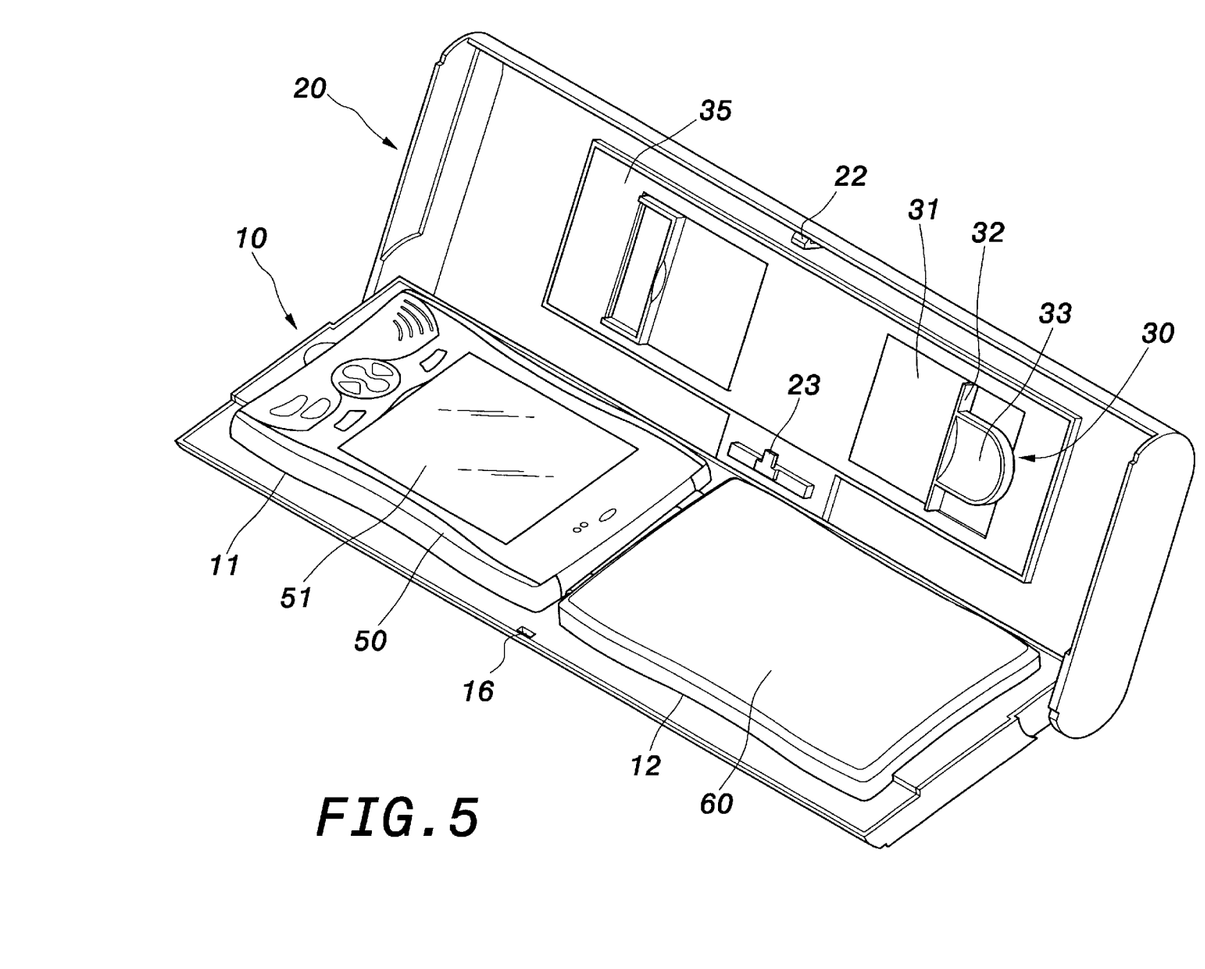
FIG. 5 shows the perspective view of the first preferred embodiment of the present invention wherein the portable electronic apparatus is placed.

With reference now to FIG. 5, the storage box for portable electronic apparatus of the present invention can be used for a transversely arranged PDA 50 and a foldable keyboard 60. The transversely arranged PDA 50 and the foldable keyboard 60 are placed within the first accommodation space 11 and the second accommodation space 12 when they are not used and are covered by the cover 20 as shown in FIG. 4. The storage box for portable electronic apparatus of the present invention provides both protective and portable function to the PDA 50 and the keyboard 60.

Figure 6:
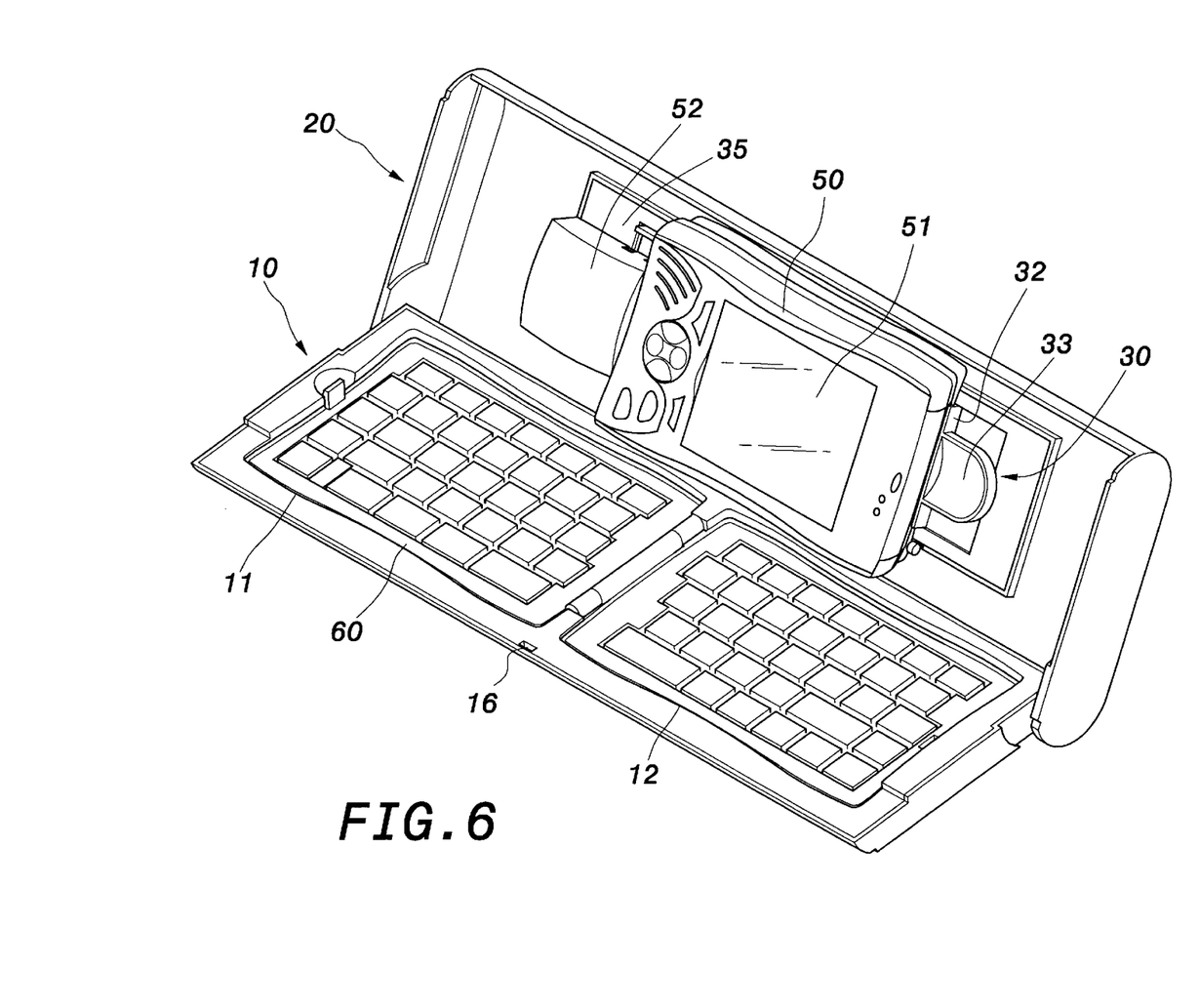
FIG. 6 shows the perspective view of the first preferred embodiment of the present invention wherein the portable electronic apparatus is in operation state.

With reference now to FIG. 6, when user wants to use the PDA 50 and the keyboard 60, the PDA 50 is lay against the inner side of the opened cover 20 such that the PDA 50 is placed in operation state. Afterward, the connector (not shown) of the PDA 50 is connected to the second connector 23 such that the PDA 50 is electrically connected to the second connector 23. The user operates the holding part 33 to push the clamping members 31 inward such that the clamping parts 32 clamp tightly the PDA 50. The PDA 50 can be connected to an expansion module 52.

Moreover, the foldable keyboard 60 is unfolded and placed within the two spaces 11 and 12. The connector (not shown) of the foldable keyboard 60 is connected to the first connector 14 such that the foldable keyboard 60 is electrically connected to the PDA 50 through the first connector 14, the connection cable 24 and the second connector 23. In this situation, the PDA 50 and the foldable keyboard 60 are advantageously placed in operation positions.

Figure 7:
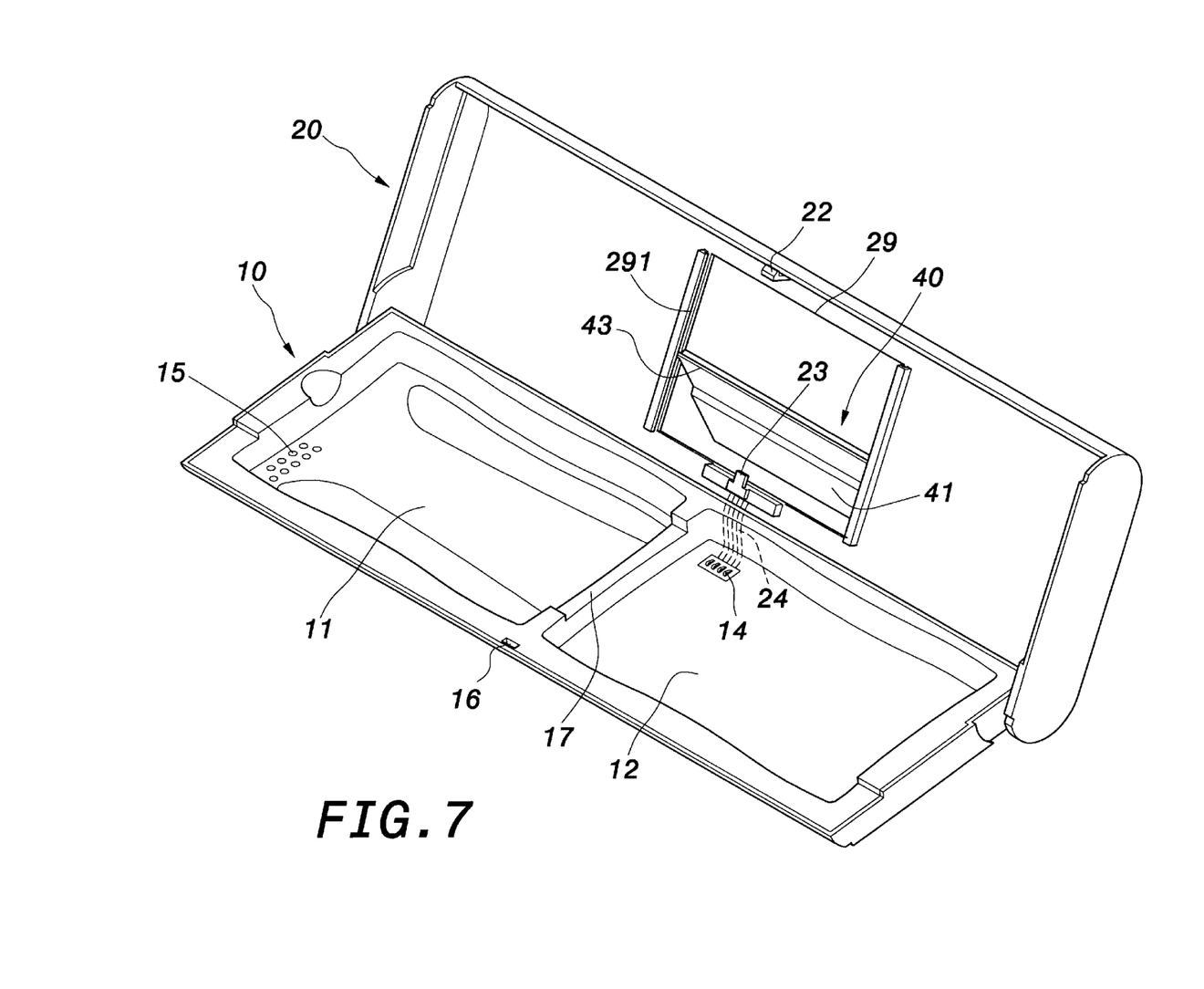
FIG. 7 shows the perspective view of the second preferred embodiment of the present invention with opened cover.
Figure 8:
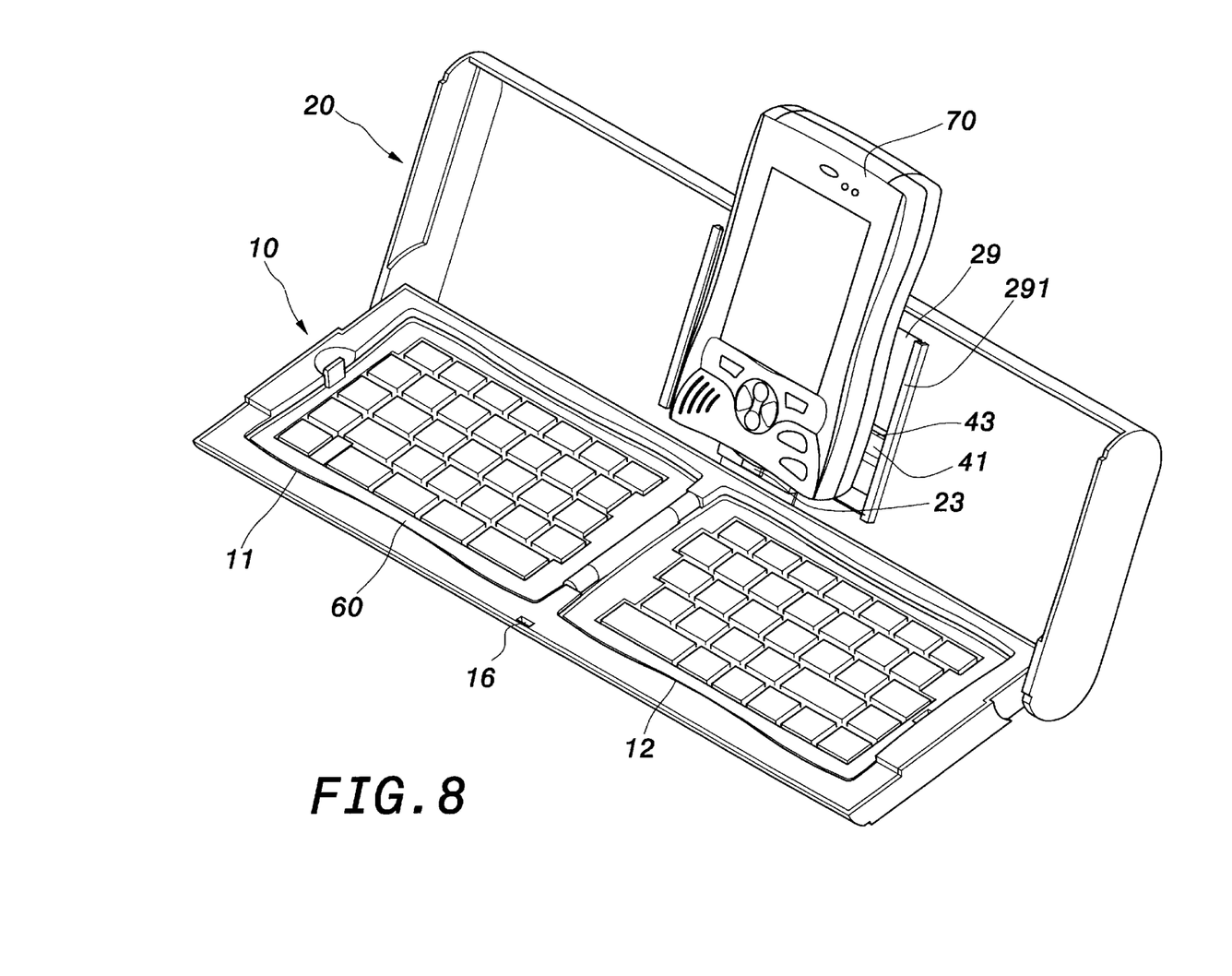
FIG. 8 shows the perspective view of the second preferred embodiment of the present invention wherein the portable electronic apparatus is in operation state.

FIGS. 7 and 8 shows the storage box for portable electronic apparatus according to another preferred embodiment of the present invention. The storage box for portable electronic apparatus can be used for an erectly arranged PDA 70 and a foldable keyboard 60. In this embodiment, the clamping means 30 is saved and the cover 20 has a through hole 29 and a supporting means 40 on outer side thereof. The supporting means 40 is rack 41 of panel shape and corresponding to the through hole 29. The rack 41 has sliding shaft 43 on one side thereof and the through hole 29 has two sliding grooves 291 on both sides thereof. The rack 41 is connected to the cover 20 through the sliding shaft 43 and the two sliding grooves 291. When the rack 41 is not used, the rack 41 is received in the through hole 29 to seal the through hole 29. When the rack 41 is to be used, the sliding shaft 43 is slid in the sliding groove 291 to pull outward the rack 41 until the rack 41 has a specific angle with the cover 20. In this situation, the cover 20 has an inclined angle as shown in FIG. 7.

To use the PDA 70, user can place the PDA 70 on inner side of the inclined cover 20 and plug the connector (not shown) of the PDA 70 is connected to the second connector 23. Therefore, the PDA 70 is electrically connected to the second connector 23 and the keyboard 60.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A storage box for portable electronic apparatus comprising:

a box body having a first accommodation space and a second accommodation space therein, the first accommodation space having a first connector therein; and a cover having a second connector therein, the second connector being electrically coupled to the first connector through a connection cable, the cover having clamping means on an inner side thereof, the clamping means, being composed of two clamping members, each clamping member having a clamping part and a holding part, the two clamping members being slidably fit to the inner side of the cover for clamping an electronic apparatus placed on the cover.

* * * * *